Figure 1:
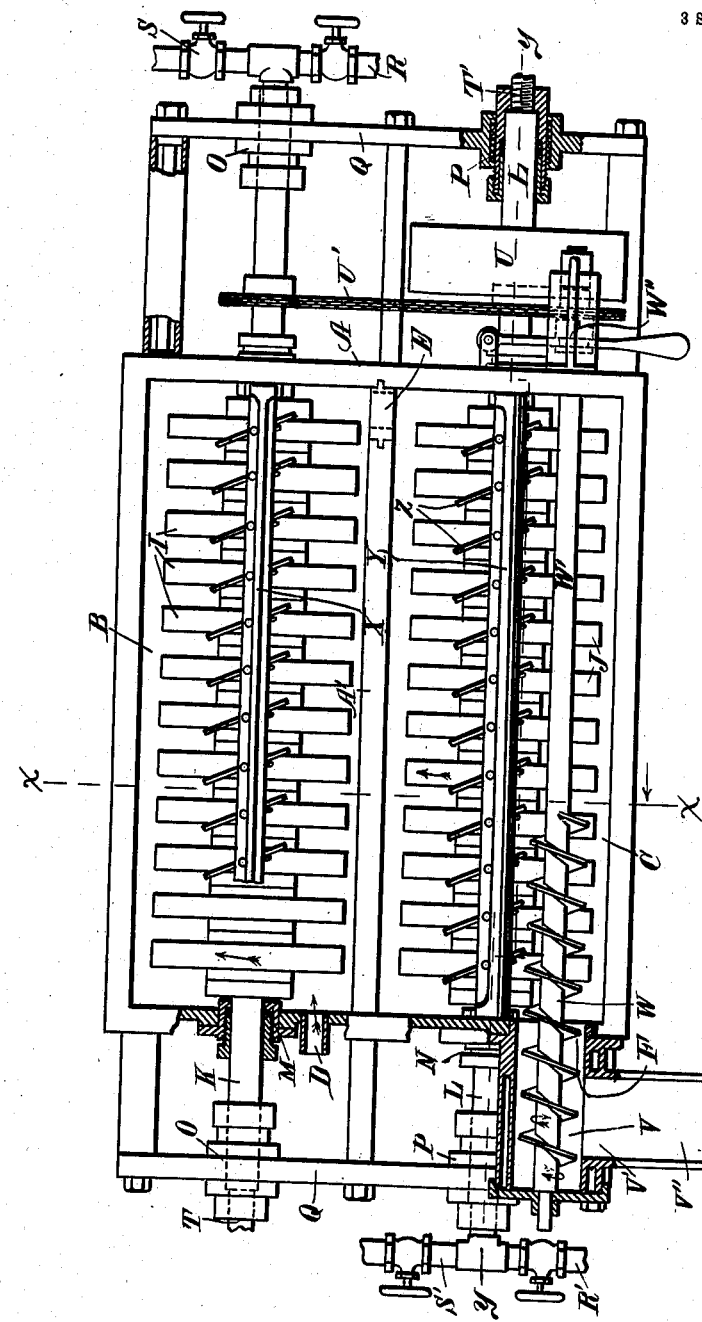

T. L. VALERIUS.
ICE CREAM FREEZER.
APPLICATION FILED AUG. 20, 1906.

899,928.

Patented Sept. 29, 1908.
3 SHEETS—SHEET 1.

Witnesses:

Inventor
Theodore L. Valerius,
By
Attorney

T. L. VALERIUS.
ICE CREAM FREEZER.
APPLICATION FILED AUG. 20, 1906.
899,928.
Patented Sept. 29, 1908.
3 SHEETS—SHEET 2.
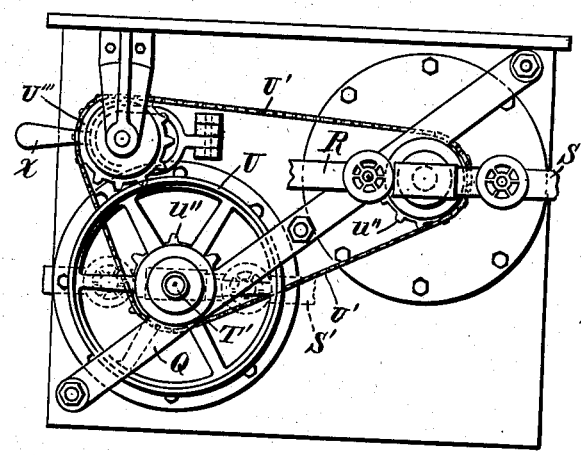
Fig. II.
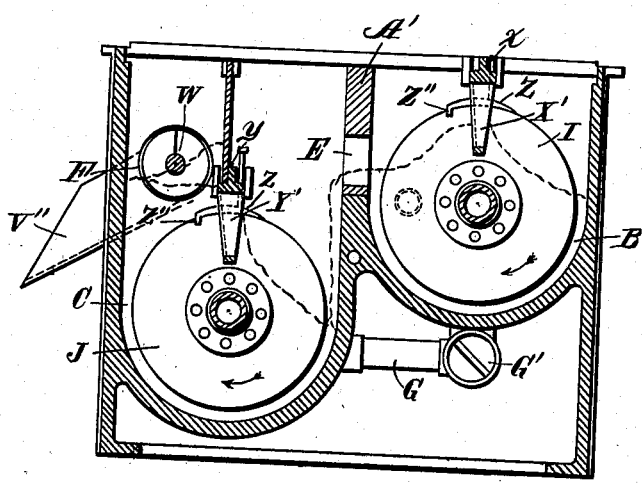
Fig. III.
Witnesses:
Inventor:
Theodore L. Valerius,
by
Atty.

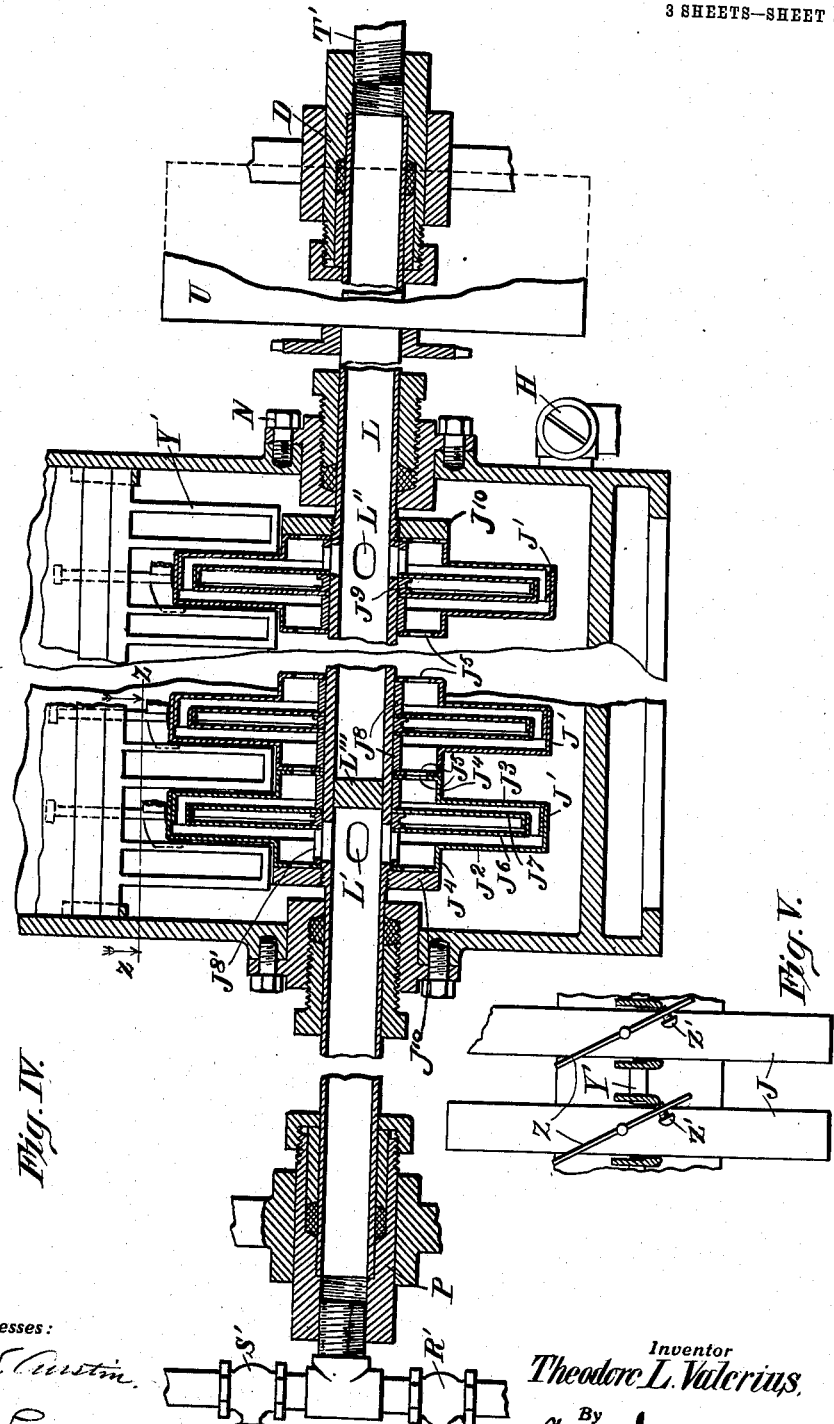

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

No. 899,928.      Specification of Letters Patent.      Patented Sept. 29, 1908.

Application filed August 20, 1906. Serial No. 331,316.

*To all whom it may concern:*

Be it known that I, THEODORE L. VALERIUS, a citizen of the United States, and a resident of Fort Atkinson, county of Jefferson, and State of Wisconsin, have invented a certain new, useful, and Improved Ice-Cream Freezer, of which the following is a full, clear, and exact description, such as will enable others skilled in the art to which it appertains to make and use the same.

My invention relates to the art of manufacturing ice cream and the like, and has special reference to improvements in ice cream freezers.

The primary object of my invention is to provide an apparatus, whereby liquid, such as ice cream custard may be reduced to a semi-frozen state, for subsequent refrigeration in suitable storage or packing vessels, and further to provide an apparatus whereby the process of manufacturing ice cream and the like may be carried on continuously.

Further and particular objects of my invention, as compared with such as are in present-day use, are: to reduce the cost of large capacity ice cream freezers, to lessen the labor of operating ice cream freezers, to provide a freezing apparatus which may be operated with less power than usual, to make it easier to maintain the apparatus in sanitary condition, and finally, to provide an ice cream freezer, the product of which shall be greatly increased in volume compared with the volume of the custard supplied to the machine.

Broadly defined my invention consists in an ice cream freezer, comprising a freezing vessel that is open at the top; which is equipped with means for feeding the liquid to be frozen to said vessel and with means for agitating and refrigerating the contents of said vessel and which is constructed to discharge said contents, when partially frozen, from the top of said vessel, whereby the freezing process may be conducted or carried on continuously. And further my invention consists in improved freezing apparatus, comprising a plurality of such freezers, so arranged that the semi-frozen product of one is discharged into another, the process of freezing being completed in the last of the series.

My invention in its preferred form, comprises a trough-like receptacle or vessel, preferably open at the top, in combination with an internally cooled rotary freezing device, occupying the lower part of said vessel, suitable scrapers coöperating with said device, means for feeding the liquid to be frozen to said vessel, and means for removing or discharging the semi-frozen liquid therefrom.

Further, the preferred structure includes two or more freezers of the next proceeding description arranged and operated in series.

Further, my invention consists in a liquid freezing apparatus, comprising a vessel which is preferably open at the top, in combination with means for agitating and freezing the contents of said vessel, and a rotary member at or near the top of said vessel for removing the semi-frozen liquid therefrom.

My invention also consists in various novel constructions and in combinations of parts, all as hereinafter described, and particularly pointed out in the appended claims.

My invention will be more readily understood by reference to the accompanying drawings forming a part of this specification, and in which Figure I is a plan view of a liquid freezing apparatus embodying my invention, portions thereof being shown in section. Fig. II is an end view of the apparatus. Fig. III is a vertical section on the line X—X of Fig. I. Fig. IV is an enlarged detail in vertical section on the line Y—Y of Fig. I. Fig. V is an enlarged plan view on the line Z—Z of Fig. IV, showing the adjustable clearing devices or scrapers.

The apparatus shown in the drawings and hereinafter described in detail, is adapted for freezing various liquids, but its ordinary use is in the manufacture of ice cream, and it is known as an ice cream freezer.

Referring to the drawings, the body portion, A, of the freezer or apparatus, contains two parallel trough-like vessels, B and C, the bottom of the latter being at a lower level than the bottom of the former.

The arrangement of the troughs and the general construction of the body are well shown in Figs. I and III, from which it will be seen that the vertical walls of the troughs or vessels rise to the same level, although the bottoms of the troughs are at different levels. The bottoms of the vessels are preferably semi-cylindrical. The liquid to be frozen is admitted to the upper vessel, B, through a pipe or spout, D. The flow of liquid is controlled by any suitable means (not shown)

and while the machine is in operation, is continuous. From the first or upper vessel, B, the liquid overflows into the lower vessel, C, through a duct, E, provided in the intermediate wall, A'. The frozen or semi-frozen liquid is removed or discharged from the lower vessel through an opening, F, provided at or near the top thereof, at the end opposite the duct, E.

G, represents a drain by-pass containing a valve, G', by which the contents of the upper vessel may be drawn off into the lower vessel, after the supply of liquid has been cut off and before the apparatus is stopped or shut down.

H, represents the drain cock of the lower vessel by which the machine may be completely emptied, preparatory to cleaning the same.

Within the troughs or vessels, B and C, I arrange the freezing members, I and J. These are of cylindrical form and are constructed or mounted upon respective hollow shafts, K and L. The shafts rotate in suitably packed bearings, M and N in the ends of the vessels. The ends of the shafts, K and L are also held in stationary stuffing boxes, O, P, arranged in frame-work, Q, on the ends of the body, A.

At that end of the shaft, K, which is remote from or opposite the liquid inlet, D, a connection is provided for supplying freezing fluid to the hollow shaft and to the refrigerating device or cylinder mounted thereon. This connection is a valved pipe, R, which enters the stuffing box, O. The freezing fluid is supplied thereto by suitable means, not shown, such as a brine tank and circulating pump.

S, represents a valved steam pipe, which joins the brine connection; to the end that the temperature of the member, I, may be raised when it is necessary to remove frozen or caked liquid therefrom, and also for the purpose of sterilizing the member, I, after the apparatus has been washed. The brine or other freezing fluid leaves the member, I, through a return pipe, T, connected with the other stationary stuffing box, O.

E, is the liquid inlet for the vessel, C, and at the opposite end of the shaft, L, said shaft, or more specifically its stuffing box, P, is equipped with valved brine and steam connections, S' and R'.

T' represents the outlet or return connection of the shaft, L.

A driving pulley, U, is arranged on the shaft, L, and the shafts, L and K, are connected by a sprocket belt, U', running over sprocket pulleys, U'', fixed on said shaft. In the preferred construction the shafts are rotated at the same speed, as I find that the best results are obtained under such conditions.

At the end of the vessel, C, I arrange a discharge head, V. This is a continuation of the opening, F, and within it is a spiral conveyer, W, which extends or reaches into the upper part of the vessel, C. The conveyer shaft, W', is mounted in suitable bearings, and is provided with a sprocket wheel, U''', operated by the belt, U'.

W'', represents a clutch mechanism for connecting the sprocket, U''', with the shaft, whereby the rotation of the conveyer, W, may be controlled, to effect or stop the discharge of frozen liquid from the apparatus.

It will be noted that the head, V, is provided with discharge opening, V', in its side, through which the frozen liquid is gently discharged upon an inclined shelf or spout, V'', whence the frozen substance falls into a can or vessel placed to receive it.

X and Y represent longitudinal bars or partitions arranged in the vessels, B and C, above the rotary members therein. These carry a plurality of small individually adjustable scrapers, Z, for removing the partially frozen liquid from the peripheries of the freezing cylinder. The partition bars, X and Y, are provided with fingers, X', Y', which occupy the annular grooves of the cylindrical members, I, and J, and remove the freezing liquid from the surfaces thereof. Said fingers have the form of light frames or rectangles containing openings which permit the liquid to freely surge or circulate from side to side of the vessel, under the propulsion of the rotary members. Actual contact between the rotary member and the scraping devices is avoided, to preserve the metallic surfaces, but said devices so closely approach said surfaces as to effectually remove all but a very thin film of frozen liquid from the rotating member. When the scrapers, Z, are lifted they may be freed and turned into opposite positions. Small screws, Z', are preferably provided for accurately adjusting the scrapers, Z, with relation to the corresponding portions of the rotary members, I and J. It will be noted that the scrapers have downwardly turned ends, Z'', which clean the corner surfaces of the cylinders. The scrapers occupy inclined or diagonal positions with respect to the axis of the rotary members and serve as deflectors, which according to position, either retard or accelerate the flow of liquid in respective vessels. The partitions X and Y are adapted for easy removal, to facilitate the cleaning of the machine or apparatus.

The members, I and J are preferably identical in form and construction, hence the description of one will serve for both. In Fig. IV, I have illustrated one of these members in such manner as to disclose its construction in detail. Broadly speaking it comprises a plurality of hollow disks or short cylinders, J'. These I employ with a view to increasing the refrigerating or chilling area of the rotary member and also for the purpose of increasing the efficiency of said member, as a means for aerating the liquid under treatment.

Near its ends the hollow shaft, L, is provided with two sets of openings or ports, L' and L'', through which the freezing fluid is admitted to and discharged from the freezing member or cylinder. A plug, L''', in the shaft, L, prevents the direct passage of the freezing fluid from end to end of the shaft and forces it to travel through the freezing member. Each hollow disk, J', preferably comprises two interfitting flanged disks, $J^2$, $J^3$, each provided with a hub portion, $J^4$. The ends of the hub portions contain openings, $J^5$. The disks, $J^2$ and $J^3$, are mounted upon the shaft, L, and within the same are other interfitting disks, $J^6$, $J^7$, which form a radial partition of less diameter, adapted to cause the freezing fluid to circulate upon the inner walls of the hollow disk, J'. The metal used in making the disks is preferably sheet copper. The inner disks are held and the outer disks are spaced by metal rings, $J^8$—$J^8$ and $J^9$. The flanges of the disks, $J^2$ and $J^3$, are united as by the process of brazing. The ends of the disk links are joined in like manner. Such is the construction throughout. The hollow disks are held by end pieces, $J^{10}$, which being first tightly screwed onto the shaft are afterward soldered or brazed at all joints. The spacing rings, $J^8$, at the ends of the device contain openings, $J^{8'}$, corresponding to the ports, L' and L'' in the hollow shaft.

From the foregoing it will be understood that the freezing fluid enters the freezing member at the ports, L', and passing into the first disk flows about the partition disk. Returning or flowing from the periphery of the partition or dividing disk to the hollow hub, the fluid passes into the next hollow disk, J', and so on to the discharge end of the member, when the fluid escapes through the ports, L''. The flow of fluid is constant; hence the rotary member is maintained at a temperature below freezing. The walls of the vessels, B and C are exposed to the atmosphere and have no freezing function. This being the case the liquid will not freeze upon said walls and hence it is not necessary to provide means for scraping the inner surfaces of the vessels.

The operation of that form of my invention which is herein shown and described, is as follows: A driving belt (not shown) being placed upon the pulley, U, the members, I and J are started in rotation. The speed with which these members are rotated is relatively low, approximating one hundred revolutions per minute in most cases. The freezing fluid valves are then opened and the fluid or brine system being in operation, the freezing fluid will be circulated through the members I and J. The temperature of the refrigerating members is thus lowered to a point below freezing. The ice cream custard or like liquid to be frozen is admitted to the vessel or trough B through a suitable regulator (not shown) connected with the inlet D. It will be noted that this inlet is at the opposite end from the outlet E and it will also be noted that the inlet D is remote from the point at which the freezing fluid enters the member I, and hence as the liquid moves toward the outlet E it approaches the coldest end of the member I, being subjected to the increasing refrigerative effect of the member I as it flows or moves from end to end thereof. The body of custard which quickly accumulates in the vessel B when the inlet D is opened to admit the custard, partly submerges the member I, but never wholly submerges the same, for the reason that the outlet E is below the top of the rotating member I.

The direction of rotation of the member I is indicated by the arrow on Fig. 1 of the drawings, and it will be observed that the side of the member I which is adjacent to the outlet E rotates upwardly, tending to elevate the custard slightly, and in actual operation the height of the partially frozen custard at the outlet E considerably exceeds its height at the receiving end of the trough or vessel. The disk portions of the member I are of only slightly less diameter than the vessel B, and therefore the disks serve as partitions in the vessel and subdivide the body of custard into many smaller bodies, each of which is obviously subjected to the cooling effect of the adjacent disks. The disks prevent the rapid flow of the custard from the inlet to the outlet end of the vessel, and the flow or movement of the liquid is further retarded by the scrapers Z on the bar or partition X, which scrapers are adjusted to deflect the liquid or custard backwardly. The partially frozen custard which overflows from the vessel B at the outlet E, falls into the vessel C and therein moves toward the discharge end, which latter contains the discharging device or conveyer W. As in the case of the upper freezing member, the custard which enters the lower vessel flows therein in a direction contrary to the flow of the freezing fluid in the member J, the coldest end of which is at the discharge end of the vessel C. The body of custard in the lower vessel C is acted upon by the refrigerating disks in the same manner as by the disks in the upper vessel, being subdivided and subjected to progressive refrigeration thereon and thereby up to the time that it reaches what may be termed the discharge end of the member J, i. e., the end thereof which is below the conveyer W. The member J rotates in the direction indicated by the arrow in Fig. 1, so that the side thereof which is below the conveyer rotates upwardly toward the same and tends to lift the frozen custard within reach of the conveyer. As the frozen custard in the vessel C is stiffer or thicker than the custard in the vessel B, it is necessary to adjust the scrapers Z in such manner as to force the custard forward toward the discharge end of the vessel, as indicated in Fig. 1. It will be obvious that the particles of custard which are frozen are lighter than the liquid parts of the custard and therefore float to the top. Being separated in this manner and elevated by the action of the member J, the custard which is ready to be discharged naturally rises within reach of the conveyer, which being in rotation gently scoops off and withdraws the frozen custard from the top or surface thereof at the discharge end of the vessel C. The ice cream thus gently withdrawn or floated out of the top of the vessel C is propelled into the tube or trough V. It is smoothed out by the conveyer and discharged upon the inclined spout V''.

The mechanical operation of the freezer being now understood I will further explain the freezing operation or process which is conducted therein, proceeding on the assumption that the machine is already in operation, with both vessels filled and with a continuous supply of custard at the inlet D. As before explained, the disks of the refrigerating members I and J subdivide the body of custard into a large number of small bodies, the particles composing each of which are subjected to the direct refrigerating action of the walls which inclose them. The relatively warm custard which enters at the inlet D falls into the first space or subdivision of the vessel B. Here it encounters the first disk of the member I. The freezing fluid having passed through the other disks of the member I is warmest in the first disk; therefore, the fresh custard is not at first severely chilled, but nevertheless loses part of its heat. Thus the custard as it flows or moves from disk to disk loses part of its heat to each thereof, being gradually reduced to a low temperature, it being substantially true that no particle or small quantity of the custard is frozen at the first instant of its contact with the surface of the freezing member. From the foregoing it will be seen that the freezing operation is of a progressive nature and that such operation is only made possible by the subdivision of the body of custard in the freezing vessel B. As before explained, the disks are only partially submerged in the liquid, and in their rotation they carry very thin films of custard. The custard which congeals upon the surfaces of the disks is scraped off by the fingers which extend downwardly between them and by the angularly positioned scrapers Z. The congealed or partly congealed quantities of custard are therefore returned to the vessel to be further acted upon by the chilled member. The disks in rotating in the custard do not violently agitate or beat the same, and for this reason and because of the progressive refrigeration of the liquid, the buttering of the custard, observed in other freezers, is wholly avoided. As the top of the vessel is open to the atmosphere, the air reaches all parts of the surface of the custard, resulting in the thorough aeration thereof. Furthermore, the custard which is elevated by the disks flows through and between the scraping fingers and scrapers Z, being divided into a large number of fine or thin streams which take up large quantities of air. The ice cream is, therefore, aerated and expanded by air in the best possible manner, and the air which is once taken up by the custard is not forced out of the same again as in other freezers, because it is never subjected to shocks or to a beating action, which would tend to deflate the custard or cream. The progressive agitation and refrigeration to which the custard is subjected in the vessel B, and which results in delivering it at the outlet in a partially frozen condition, is repeated in the vessel C, in which latter the freezing operation is completed.

One of the great advantages of my machine resides in the perfect separation which is made between the frozen and the unfrozen particles of cream by the combined action of gravity and the elevating or lifting action of the rotating disks, it being evident that the frozen particles will always rise or float upon the more liquid portion of the custard. It is because of this that only the completed product is carried away by the conveyer W, which operates in the continuously forming mound of ice cream which piles against the partition Y at the discharge end of the vessel C. The conveyer works in the top of the vessel C, extending part way across the same. It therefore works continuously in the body of ice cream and smoothes or refines it while pushing, scooping or floating it toward the outlet F, and this process is continued in the discharge trough V. Solid masses of cream are never removed by the conveyer, for the reason that the conveyer prevents the formation of a mass of cream at the discharge end of the freezing vessel. It follows, therefore, that the tube or trough V is never more than partially filled with ice cream, and the latter is discharged into the spout V'' in small quantities or layers and without being subjected to pressure, which would deflate or compress the product. A further, and special advantage of my machine is that all parts thereof operate within the sight of the attendant, in other words, the process is carried on under the eyes of the operator, and he may therefore see and test the ice cream in its several stages of manufacture and is thus enabled to accurately control the operation of the machine and determine the quality of its product.

As numerous modifications of my invention will readily suggest themselves to one skilled in the art, I do not confine the invention to the specific structure herein shown and described.

Having thus described my invention, I claim as new and desire to secure by Letters Patent:

1. A continuous ice cream freezer comprising a vessel to contain the custard and which is open at the top to expose the custard to view and to admit air thereto, in combination with means for continuously supplying custard thereto, means for therein mixing, refrigerating and aerating the custard and means for continuously discharging the finished product from the top of the vessel, substantially as described.

2. A continuous ice cream freezer comprising a vessel to contain the custard and which is open at the top to expose the custard to view and to admit air thereto, in combination with means for directing a stream of custard into said vessel, means for therein mixing, refrigerating and aerating the custard and mechanism in the upper part of said vessel for discharging the frozen product therefrom, substantially as described.

3. A continuous ice cream freezer comprising a vessel to contain the custard and which is open at the top to expose the custard to view and to admit air thereto, in combination with means for feeding custard thereto, means for therein mixing, refrigerating and aerating the custard and causing the finished product to rise and accumulate in the upper part of the vessel and said vessel being constructed to discharge the finished product from its said upper part, substantially as described.

4. A continuous ice cream freezer comprising a horizontally elongated vessel to contain the custard and which is open at the top to admit air and expose the custard to view, means for supplying custard to one end of said vessel, means for therein mixing, refrigerating and aerating the custard, and for driving the finished product toward the other end of the vessel, and means at said other end of the vessel for discharging the finished product thus delivered thereto, substantially as described.

5. A continuous ice cream freezer comprising a vessel to contain the custard and which is open at the top to expose the custard to view and to admit air thereto, in combination with means for continuously maintaining a body of liquid custard in said vessel, said vessel having a discharge opening above the normal custard level, for discharging the finished product and mechanism in said vessel co-acting to mix, refrigerate and aerate the custard and to deliver the finished product at said opening, substantially as described.

6. A continuous ice cream freezer comprising a vessel to contain the custard and which is open at the top to expose the custard to view and to admit air thereto, in combination with means for continuously maintaining a body of liquid custard in said vessel, said vessel having an opening above the normal liquid level for discharging the finished product, a collecting and discharging device operable in the vessel and adapted to discharge the product through said opening, and mechanism in said vessel co-acting to mix, refrigerate and aerate the custard and deliver the finished product to said device, substantially as described.

7. An ice cream freezer comprising a horizontally elongated vessel to contain the custard and having an open top to admit air thereto, in combination with means for continuously maintaining a body of liquid custard in said vessel, means for continuously discharging the finished product from one end of said vessel, at a point above the normal level of the liquid custard and similarly elongated mechanism in said vessel for receiving the liquid custard at one end of the vessel, for agitating and aerating the custard, for moving it slowly toward the discharging means, for progressively refrigerating the custard and permitting the frozen product to rise to the surface of the liquid custard at the end of the vessel in position to be removed by said discharging means, substantially as described.

8. A continuous ice cream freezer comprising a vessel to contain the custard and which is open to expose the custard to view and admit air thereto, in combination with internally cooled mechanism operable in said vessel and adapted to repeatedly and progressively refrigerate, mix and aerate the custard and means at the top of the vessel for discharging the finished product therefrom, substantially as described.

9. A continuous ice cream freezer comprising a vessel to contain the custard in combination with means for continuously supplying custard thereto, means in the top of the vessel for discharging the finished product therefrom, an internally cooled mechanism operable in said vessel and adapted to repeatedly and progressively refrigerate, mix and aerate the custard and also adapted and operable to elevate the finished product to said discharging means, substantially as described.

10. A continuous ice cream freezer comprising a horizontally elongated vessel to contain the custard, in combination with means for continuously supplying custard thereto, means in the upper part of the vessel at the end thereof for discharging the frozen product therefrom and an internally cooled refrigerating and aerating mechanism operable in said vessel and adapted to repeatedly and progressively refrigerate the custard and propel the frozen product to the discharging means, substantially as described.

11. A continuous ice cream freezer comprising a horizontally elongated vessel, in combination with means for supplying custard thereto, mechanism at the top of the vessel above the liquid custard level therein for discharging the finished product therefrom and internally cooled mechanism operable in said vessel to repeatedly and progressively refrigerate, mix and aerate the custard, and propel the finished product to said mechanism, substantially as described.

12. A continuous ice cream freezer comprising a horizontally elongated custard vessel in combination with means for supplying a stream of custard thereto, mechanism in the vessel for converting the custard into ice cream, and mechanism operable in the upper part of the vessel for continuously collecting and discharging the finished product from the surface of the body of liquid custard in the vessel, substantially as described.

13. A continuous ice cream freezer comprising a custard vessel and an internally cooled refrigerating member, relatively revoluble, in combination with perforated scrapers forming a partition in said vessel and co-acting with said refrigerating member and therewith adapted to convert the custard into finished product and means for continuously discharging the finished product from the vessel, substantially as described.

14. A continuous ice cream freezer comprising a custard vessel and an internally cooled refrigerating member, relatively revoluble, in combination with scrapers co-acting with said refrigerating member and therewith adapted to convert the custard into finished product, and frozen-product collecting and discharging means, arranged and operable in the upper part of said vessel, substantially as described.

15. A continuous ice cream freezer comprising a custard vessel and an internally cooled refrigerating member, relatively revoluble, in combination with scrapers co-acting with said member and therewith adapted to convert the custard into finished product, said vessel and member being horizontally elongated, means at one end thereof for supplying liquid custard and mechanism arranged and longitudinally operative in the other end and upper part of said vessel for collecting and discharging the finished product, substantially as described.

16. A continuous ice cream freezer comprising an elongated custard vessel in combination with a similarly elongated internally cooled refrigerating member, scraping, mixing and aerating means co-acting with said member, said means and member being relatively revoluble, means for supplying a stream of custard to said vessel and means in the upper part of said vessel operative to collect and discharge the finished product therefrom, substantially as described.

17. A continuous ice cream freezer comprising a horizontally elongated custard vessel which is open at the top to expose the custard to view and admit air thereto, in combination with a similarly elongated internally cooled refrigerating member in said vessel, scraping, mixing and aerating means co-acting with said member in the vessel, said means and member being relatively revoluble, means for supplying a stream of custard to one end of said vessel and means in the upper part of the other end of said vessel to therein collect and discharge therefrom the finished product, substantially as described.

18. An ice cream freezer comprising a custard container or vessel which is open to atmosphere, in combination with internally refrigerated mechanism in the vessel adapted to mix, aerate and refrigerate custard therein said vessel having a discharge opening at its top and said mechanism being adapted to elevate the frozen product to said opening, substantially as described.

19. An ice cream freezer comprising a non-refrigerated vessel to contain the custard, in combination with an internally refrigerated member, revoluble in said vessel, scraping, mixing and aerating means co-acting with said member to convert the custard into ice cream and means for discharging the finished ice cream from the vessel, substantially as described.

20. An ice cream freezer comprising a non-refrigerated stationary vessel to contain the custard, in combination with an internally refrigerated member operable in said vessel, scraping, mixing and aerating means co-acting with said member to convert the custard into ice cream, means for supplying custard to said vessel and said vessel having an opening at its top for the discharge of the ice cream, substantially as described.

21. An ice cream freezer comprising a non-refrigerated vessel to contain the custard, in combination with an internally refrigerated member operable in said vessel, scraping, mixing and aerating means co-acting with said member to convert the custard into finished product, means for directing a stream of custard into said vessel and mechanism for collecting the finished product and discharging it from the upper part of said vessel, substantially as described.

22. An ice cream freezer comprising a non-refrigerated horizontally elongated custard vessel, in combination with an internally refrigerated member revoluble in said vessel, scraping, mixing and aerating means co-acting with said member to convert custard into finished product, means for directing a stream of custard into said vessel, a mechanism revoluble in the upper part of said vessel and adapted to remove the finished or frozen product therefrom and means for rotating said member and said mechanism, substantially as described.

23. A non-refrigerated custard vessel which is open at the top to expose the custard to view and admit air thereto, in combination with an internally refrigerated member in said vessel, scraping means co-acting with said member to refrigerate, agitate and aerate the custard, said member and said scraping means being relatively revoluble in the vessel and adapted to elevate and collect the frozen product at the top of the vessel, means for supplying liquid custard to the vessel and means for continuously collecting and removing the finished product in and from the top thereof, substantially as described.

24. A continuous ice cream freezer comprising a horizontally elongated custard vessel, in combination with an internally cooled freezing member to be partially submerged in custard in said vessel, scraping means for removing the frozen custard from said member and for causing it to move longitudinally in said vessel, and said vessel having an opening at its end for the discharge of the finished product, substantially as described.

25. An ice cream freezer comprising a custard vessel which is open to atmosphere at the top, in combination with means for directing a stream of custard into said vessel and maintaining the vessel in partially filled condition, an internally refrigerated member in said vessel, scrapers co-acting with said member to remove the frozen custard therefrom and agitate or mix the custard, means causing the frozen product to collect upon the surface of the liquid custard adjacent to the upper part of a wall of the vessel, substantially as described.

26. An ice cream freezer comprising a custard vessel which is open to atmosphere at the top, in combination with means for directing a stream of custard into said vessel and maintaining the vessel in a partially filled condition, an internally refrigerated member revoluble in said vessel, scrapers fixed in said vessel, co-acting with said member to convert the custard into ice cream and cause the same to collect upon the surface of the liquid custard adjacent to the upper part of a wall of the vessel and means for withdrawing the ice cream from the vessel, substantially as described.

27. A continuous ice cream freezer comprising a horizontally elongated vessel which is open at the top to admit air to the custard, in combination with means for directing a stream of custard into said vessel, a similarly elongated internally refrigerated member revoluble in said vessel, scraping means for removing the frozen custard from said member, said scraping means being suitably fixed in said vessel above said member and co-acting with said member to mix and aerate the custard and means for removing the frozen product from the surface of the custard in the vessel, substantially as described.

28. An ice cream freezer comprising a horizontally elongated vessel which is open at the top to admit air to the custard, in combination with means for directing a stream of custard into said vessel, a similarly elongated internally refrigerated member revoluble in said vessel, scraping means for removing the frozen custard from said member, said scraping means being suitably fixed in said vessel above said member and co-acting with said member to mix and aerate the custard said member and said scraping means co-acting to propel the frozen custard to the end of the vessel upon the surface of the unfrozen custard, substantially as described.

29. A continuous ice cream freezer comprising a horizontally elongated custard vessel, in combination with means for directing a stream of custard into said vessel and maintaining the vessel in partially filled condition, a similarly elongated internally refrigerated member revoluble in said vessel, scraping means for removing frozen custard from said member, said scraping means being fixed in the vessel above said member and co-acting with said member to agitate and aerate the custard and also propel the finished product to the end of the vessel and means at said end of the vessel for removing the finished product from the surface of the unfinished product, substantially as described.

30. An ice cream freezer comprising a horizontally elongated custard vessel which is open at the top to admit air to the custard, in combination with means for directing a stream of custard into said vessel, a similarly elongated refrigerating member revoluble in said vessel and normally partially submerged in custard therein, scraping means co-acting with the upper part of said refrigerating member, said member and said scraping means rising above the custard level in said vessel and adapted to repeatedly sub-divide the custard into many falling streams, discharging mechanism at the top of said vessel, and said member and said scraping means also co-acting to elevate the finished product to said discharging means, substantially as described.

31. An ice cream freezer comprising a horizontally elongated custard vessel which is open at the top to admit air to the custard, in combination with means for directing a stream of custard into said vessel, a similarly elongated refrigerating member revoluble in said vessel and normally partially submerged in custard therein, scraping means co-acting with the upper part of said refrigerating member, said member and said scraping means rising above the custard level in said vessel and adapted to repeatedly subdivide the custard into many streams which fall into the body of custard said vessel having a discharge opening at its top and said member and said scraping means also co-acting to elevate the finished product to said discharge opening, substantially as described.

32. A continuous ice cream freezing vessel comprising a substantially horizontal custard vessel, in combination with means for feeding custard thereto and maintaining a substantially constant level or quantity of liquid custard therein, mechanism at the top of the vessel above the custard therein for removing the frozen product from the surface of the liquid custard and means for mixing, aerating and refrigerating the custard in the vessel and moving the frozen product to said mechanism, substantially as described.

33. A continuous ice cream freezer comprising a vessel, in combination with means for directing a stream of custard into said vessel, means for continuously removing the finished product from the vessel, progressive freezing mechanism for converting the custard into finished product and means in said vessel for regulating and governing the speed of the flow of the custard from the inlet to the discharge means, substantially as described.

34. A continuous ice cream freezer comprising a custard vessel having a custard inlet and an ice cream outlet, in combination with relative revoluble parts in said vessel adapted to convert the custard therein into ice cream and slowly propel the same toward the said outlet and certain of said parts being adjustable to vary the propulsive effect of the relatively revoluble parts without varying the rotative speed thereof, substantially as described.

35. A continuous ice cream freezer comprising a horizontally elongated custard vessel having at opposite ends a custard inlet and an ice cream outlet, in combination with ice cream discharging mechanism operable in said outlet, relatively revoluble parts arranged in said vessel, similarly elongated and adapted to convert the custard therein into ice cream, and to slowly propel the same toward said discharging mechanism and means in said vessel for varying the propulsive effect of said parts without varying the rotative speed thereof, substantially as described.

36. A continuous ice cream freezer comprising a horizontally elongated custard vessel having at opposite ends a custard inlet and an ice cream discharging mechanism, in combination with relatively revoluble parts in said vessel adapted to convert custard into ice cream and to slowly propel the same toward said mechanism, means for operating said parts and said mechanism, means for starting and stopping said discharging mechanism during the operation of said parts and certain of said parts being adjustable to vary the propulsive effect of said parts without varying the rotative speed thereof, substantially as described.

37. A continuous ice cream freezer comprising a horizontally elongated custard vessel having at opposite ends a custard inlet and an ice cream outlet, in combination with a similarly elongated internally cooled refrigerating member in said vessel, scraping means for removing partially frozen custard from said member, said member and said scraping means being relatively revoluble and co-acting to agitate and aerate the custard and convert it into ice cream, said means and member also co-acting to slowly propel the custard from said inlet to said outlet and also being adjustable while in operation to vary the speed of the longitudinal flow of the custard in the wheel, substantially as described.

38. An ice cream freezer comprising a horizontally elongated custard vessel, in combination with a horizontally elongated internally refrigerated rotary member in said vessel, a plurality of fixed scrapers co-acting with said member, and a plurality of angularly adjustable scrapers also co-acting therewith, substantially as described.

39. An ice cream freezer comprising a horizontally elongated custard vessel, in combination with a horizontally elongated internally refrigerated rotary member in said vessel, a plurality of fixed scrapers co-acting with said member, a plurality of angularly adjustable scrapers also co-acting therewith, said vessel being open at the top to admit air to the custard and to permit the adjustment of said scrapers, means for supplying custard to the vessel, mechanism for removing the frozen product therefrom and means for operating said member and said mechanism, substantially as described.

40. A continuous ice cream freezer comprising a freezing vessel which is open to atmosphere at the top, in combination with an internally cooled freezing element, scraping means co-acting therewith to agitate and refrigerate the custard in the vessel and introduce air thereinto, means for continually supplying custard to said vessel and means for collecting the semi-frozen product in and discharging it from the top of said vessel, substantially as described.

41. A continuous ice cream freezer comprising an ice cream freezing vessel subdivided into a plurality of custard spaces connected in series, in combination with means co-acting to therein refrigerate, agitate and aerate the custard and convert it into ice cream, and means for discharging the ice cream from the vessel, substantially as described.

42. An ice cream freezing vessel subdivided into a plurality of connected custard spaces, in combination with means co-acting to refrigerate, agitate and aerate the custard therein and causing the same to progress from space to space, substantially as described.

43. An ice cream freezing vessel subdivided into a plurality of connected custard spaces, in combination with means co-acting to therein cause the custard to slowly progress from space to space and convert it into ice cream, means for directing a stream of custard into the first of said spaces and means for discharging the frozen product from the last thereof, substantially as described.

44. A continuous ice cream freezer comprising a horizontally elongated freezing vessel subdivided into a plurality of connected custard spaces, in combination with co-acting means, adapted to cause the custard to slowly progress from space to space, means for directing a stream of custard into the first of said spaces, and mechanism operable at the top of said vessel and adapted to remove and discharge the frozen product from the upper part of the last space therein, substantially as described.

45. An ice cream freezing vessel comprising a horizontally elongated custard vessel and refrigerating means dividing the same into a plurality of connected custard spaces, in combination with scraping, agitating and aerating means therewith co-acting to progressively convert the custard into ice cream, said vessel being open at the top to expose the custard to air, means for directing a stream of custard into the first of said spaces and means for removing the ice cream from the surface of the unfrozen custard in the last of said spaces, substantially as described.

46. A continuous ice cream freezer comprising a custard vessel having liquid inlet and outlet openings at its top, in combination with rotary refrigerating means subdividing said vessel into a plurality of connected custard spaces, scraping means co-acting with said refrigerating means to remove the partially frozen custard therefrom and agitate and aerate the same, and means for discharging the frozen product at said outlet, substantially as described.

47. An ice cream freezer comprising a custard vessel having its top open to atmosphere, in combination with a rotary refrigerating member subdividing said vessel into a plurality of connected custard spaces, scraping means co-acting with said refrigerating means to progressively convert the custard into ice cream and said vessel having an ice cream outlet adjacent to the end of said member, substantially as described.

48. A continuous ice cream freezer comprising a custard vessel having inlet and outlet openings in its top, in combination with an internally cooled rotary refrigerating member subdividing said vessel into a plurality of connected spaces, scraping means co-acting with said member to convert the custard into ice cream and certain of the scraping means being angularly positioned and co-acting with said member to propel the ice cream to said outlet, substantially as described.

49. An ice cream freezer comprising a horizontally elongated custard vessel having its top open to atmosphere, in combination with a rotary refrigerating member subdividing said vessel into a plurality of connected custard spaces, means for directing a stream of custard into the first of said spaces, stationary scrapers co-acting with said member to convert the custard into ice cream and means operable in the upper part of the last of said spaces for removing the ice cream therefrom, substantially as described.

50. In an ice cream freezer comprising a horizontally elongated custard vessel, in combination with a rotary refrigerating member subdividing said vessel into a plurality of connected custard spaces, fixed scrapers coacting with said member, angularly adjustable scrapers also co-acting therewith and means for rotating said member, substantially as and for the purpose specified.

51. An ice cream freezer comprising a horizontally elongated custard vessel, in combination with a similarly elongated rotary refrigerating member which subdivides said vessel into a plurality of connected custard spaces, means for rotating said member, a plurality of fixed scrapers co-acting with said member, a plurality of angularly adjustable scrapers also co-acting therewith and causing the frozen product to flow to the end of said vessel and means for discharging the product from the vessel, substantially as described.

52. An ice cream freezer comprising a horizontally elongated custard vessel, in combination with a rotary refrigerating member which subdivides said vessel into a plurality of connected custard spaces, a plurality of adjustable scrapers co-acting with said member, means for directing a stream of custard into the vessel and mechanism operable in the top of the vessel for removing the frozen product therefrom, substantially as described.

53. A horizontal trough-like freezing vessel, in combination with an internally cooled rotary freezing element occupying a horizontal position in said trough, means for scraping said member and causing the frozen product to slowly progress from end to end of the trough upon the surface of the custard and means at the discharge end of the vessel for removing the semi-frozen product therefrom, substantially as described.

54. A continuous ice cream freezer comprising a horizontally elongated freezing vessel which is open to the atmosphere at the top, in combination with rotary refrigerating means occupying said vessel and dividing the same into a plurality of vertical spaces connected throughout, means for supplying custard at one end of said freezing vessel, an outlet duct at the opposite end of the vessel, stationary scraping means co-acting with the refrigerating means above the surface of the body of the liquid custard and adapted to remove the partially frozen custard from the refrigerating means and subdivide the same into many falling streams or jets; whereby the custard is refrigerated, aerated and smoothed, substantially as described.

55. In an ice cream freezer, a freezing vessel which is open to atmosphere at the top, in combination with means for supplying the custard thereto, refrigerating means subdividing said vessel into a plurality of connected spaces, scraping means co-acting with said refrigerating means, said refrigerating means and scraping means rising above the custard in the vessel to aerate the custard and means at the top of the vessel for continuously discharging finished product from the surface of the liquid custard, substantially as described.

56. In an ice cream freezer, a custard vessel and means for supplying custard thereto, in combination with an internally cooled rotary member in the lower part of said vessel, a partition above said rotary member, suitable scraping means arranged on said partition and rotary means at the top of the vessel for discharging semi-frozen custard therefrom, substantially as described.

57. In an ice cream freezer, a custard vessel and means for supplying custard thereto, in combination with an internally cooled rotary member in the lower part of said vessel, a partition above said member, adjustable scrapers arranged on said partition, and means at the top of the vessel for discharging semi-frozen custard therefrom, substantially as described.

58. In an ice cream freezer, a custard vessel and means for supplying custard, in combination with an internally cooled freezing member arranged in said vessel, a partition arranged above said member and scrapers provided thereon, substantially as described.

59. In an ice cream freezer, a trough-like freezing vessel and means for supplying liquid thereto, in combination with an internally cooled rotary freezing member, horizontally arranged in the lower part of said vessel, a partition arranged above said member, scrapers provided thereon and means at the top of the vessel for discharging semi-frozen liquid therefrom, substantially as described.

60. In an ice cream freezer, a suitable vessel and means for supplying liquid thereto, in combination with an internally cooled rotary member in the lower part of said vessel, a partition above said member, a plurality of adjustable scrapers for clearing said member and means at the top of the vessel adjacent to said partition for discharging semi-frozen liquid substantially as described.

61. In an ice cream freezer, a suitable vessel and means for supplying liquid thereto, in combination with an internally cooled rotary member in the lower part of said vessel, a partition above said member, a plurality of individually adjustable scrapers for clearing said member and means at the top of the vessel adjacent to said partition for discharging semi-frozen liquid, substantially as described.

62. In an ice cream freezer, a freezing vessel and means for supplying liquid thereto, in combination with progressive freezing means, comprising an internally cooled rotary member in the lower part of said vessel, a partition parallel with said member, suitable scraping means arranged on said partition and co-acting with said member in the freezing operation and rotary means at the top of said vessel for withdrawing and discharging semi-frozen liquid therefrom, substantially as described.

63. In an ice cream freezer, a freezing vessel and means for supplying liquid thereto, in combination with an internally cooled rotary member in the lower part of said vessel, a partition parallel with said member, a plurality of adjustable scrapers co-acting with said member in the freezing operation and a rotary conveyer, occupying a horizontal position in the upper part of said vessel for discharging semi-frozen liquid therefrom, substantially as described.

64. In an ice cream freezer, two trough-like vessels arranged upon different levels, in combination with internally cooled rotary members provided in said vessels, stationary scrapers coöperating with said members and arranged above the same, a partition above the member in the lower vessel, a duct connecting the upper part of the upper vessel with said lower vessel, and rotary means adjacent to said partition for discharging the finished product from said lower vessel, substantially as described.

65. In an ice cream freezer, a custard vessel, in combinatiom with means for supplying a stream of custard thereto, means for withdrawing and discharging the frozen product from the surface of the liquid custard in said vessel, a plurality of internally cooled hollow disks arranged for rotation and partial submersion in said vessel to progressively freeze the contents thereof and suitable scraping means co-acting with said disks in the freezing operation, substantially as described.

66. In an ice cream freezer, a trough-like custard vessel, in combination with a freezing member comprising a horizontal shaft and a plurality of hollow disks mounted thereon, means for supplying freezing fluid to said disks, a plurality of stationary scrapers co-acting with said disks to clear said disks and return the custard to the vessel and means at the top of said vessel above the custard level for discharging the frozen product, substantially as described.

67. In an ice cream freezer, a single trough-like vessel which is open at the top, in combination with a freezing member horizontally arranged in said vessel and comprising a plurality of connected hollow disks, means for supplying freezing fluid to said disks, scraping means conforming to the peripheries and sides of said disks and mechanism at the top of the vessel for discharging the frozen contents thereof, substantially as described.

68. In an ice cream freezer, a trough-like vessel, in combination with a freezing member horizontally arranged in said vessel and comprising a plurality of connected hollow disks, means for supplying freezing fluid to said disks, scraping means conforming to said disks, suitable custard deflecting scrapers and means at the top of the vessel for discharging the frozen contents thereof, substantially as described.

69. In an ice cream freezer, a trough-like custard vessel, in combination with a horizontal freezing member arranged for rotation in said vessel and comprising a plurality of connected hollow disks of slightly less diameter than said vessel, means for supplying freezing fluid to said disks, suitable scraping means co-acting with said disks in the freezing operation and means for admitting custard to said vessel and other means for discharging finished product from the surface of the custard in the vessel, substantially as described.

70. An ice cream freezer comprising a horizontally elongated custard vessel, in combination with an internally cooled rotary member occupying said vessel and composed of a plurality of connected hollow disks to contain a freezing fluid, in combination with a plurality of perforated scrapers for removing the frozen custard from the sides of said disks, and a plurality of angularly positioned scrapers for clearing the peripheries of said disks, substantially as described.

71. An ice cream freezer comprising a horizontally elongated custard vessel, in combination with an internally cooled refrigerating member occupying the lower part of said vessel and composed of a plurality of suitably connected hollow disks to contain a freezing fluid, a plurality of scrapers occupying vertical positions and adapted to co-act with the sides and peripheries of said disks to convert the custard into ice cream, substantially as described.

72. An ice cream freezer comprising a horizontally elongated custard vessel, in combination with an internally cooled refrigerating member occupying the lower part of said vessel and composed of a plurality of suitably connected hollow disks to contain a freezing fluid, a plurality of scrapers occupying vertical positions and adapted to co-act with said disks to convert the custard into ice cream, means for directing a stream of custard into the end of said vessel and means for removing the finished product at the opposite end of the vessel, substantially as described.

73. A horizontally elongated custard vessel, in combination with a refrigerating member comprising a plurality of connected disks occupying vertical positions in said vessel and revoluble upon a horizontal axis, means for supplying freezing fluid to said disks, scrapers occupying substantially vertical positions in the upper part of said vessel and co-acting with said disks, means for admitting a stream of custard to said vessel and means at the end of the vessel adjacent to the side wall thereof for collecting and removing the frozen product, substantially as described.

74. An ice cream freezer comprising a vessel, in combination with an internally cooled refrigerating member comprising a plurality of connected hollow disks having a common axis, a plurality of scrapers arranged in said vessel and constituting a perforated partition therein and between and above said disks, and means for removing the frozen product from the vessel, substantially as described.

75. An ice cream freezer comprising a custard vessel, in combination with means therein co-acting to convert custard into ice cream and propel the same toward the top of the vessel in proximity to the upper portion of a wall thereof, said vessel having an outlet in said wall, a discharge head communicating therewith and a rotary spiral conveyer operable in said vessel and head, substantially as described.

76. An ice cream freezer comprising a horizontally elongated custard vessel, in combination with an internally cooled refrigerating member revoluble therein and comprising a plurality of connected hollow disks, a partition arranged above said disks, perforated scraper fingers depending from said partition between said disks and adjustable angular scrapers co-acting with the tops of said disks, substantially as described.

77. An ice cream freezer comprising a horizontally elongated custard vessel, in combination with a similarly elongated internally cooled refrigerating member revoluble in said vessel and comprising a plurality of suitably connected hollow disks, a partition or bar above said member, perforated fingers attached thereto and adapted to clear the sides of said disks, angular scrapers also attached thereto and adapted to clear the peripheries of said disks, means for directing a stream of custard into one end of said vessel and said vessel having a discharge opening in its opposite end above the normal custard level, substantially as described.

78. In an ice cream freezer, two trough-like custard vessels connected by a custard passage at the top, in combination with internally cooled rotary members arranged in the bottoms of respective vessels, suitable scrapers coöperating with respective members, means for supplying custard to one said vessel, and rotary means at the top of the other vessel for discharging the finished product therefrom, substantially as described.

In testimony whereof, I have hereunto set my hand, this 13 day of August, 1906, in the presence of two subscribing witnesses.

THEODORE L. VALERIUS.

Witnesses:
IRVING R. HIPPENMEYER,
BEN L. KINNEY.